(12) United States Patent
Brandsma

(10) Patent No.: US 10,794,451 B2
(45) Date of Patent: Oct. 6, 2020

(54) PUSHBELT FOR A CONTINUOUSLY VARIABLE TRANSMISSION AND A TRANSMISSION PROVIDED THEREWITH

(71) Applicant: ROBERT BOSCH GMBH, Stuttgart (DE)

(72) Inventor: Arjen Brandsma, Tilburg (NL)

(73) Assignee: ROBERT BOSCH GMBH, Stuttgart (DE)

( * ) Notice: Subject to any disclaimer, the term of this patent is extended or adjusted under 35 U.S.C. 154(b) by 380 days.

(21) Appl. No.: 15/539,166

(22) PCT Filed: Dec. 23, 2015

(86) PCT No.: PCT/EP2015/025114
§ 371 (c)(1),
(2) Date: Jun. 23, 2017

(87) PCT Pub. No.: WO2016/102073
PCT Pub. Date: Jun. 30, 2016

(65) Prior Publication Data
US 2018/0023664 A1 Jan. 25, 2018

(30) Foreign Application Priority Data
Dec. 23, 2014 (NL) .................... 1041121

(51) Int. Cl.
*F16G 5/16* (2006.01)
*F16G 5/00* (2006.01)
(Continued)

(52) U.S. Cl.
CPC ............. *F16G 5/16* (2013.01); *F16G 5/00* (2013.01); *F16G 5/18* (2013.01); *F16H 9/24* (2013.01); *F16H 9/125* (2013.01)

(58) Field of Classification Search
CPC ... F16G 5/16; F16G 5/18; F16G 5/166; F16G 5/00
(Continued)

(56) References Cited

U.S. PATENT DOCUMENTS 4,299,586 A * 11/1981 Van der Hardt Aberson .............. F16G 5/16 474/201
4,303,403 A * 12/1981 Lamers ..................... F16G 5/16 474/201
(Continued)

FOREIGN PATENT DOCUMENTS

EP 1 167 813 A1 1/2002
EP 1 524 451 A1 4/2005
(Continued)

OTHER PUBLICATIONS

International Search Report, dated Mar. 9, 2016, from corresponding PCT application No. PCT/EP2015/025114.

*Primary Examiner* — Michael R Mansen
*Assistant Examiner* — Raveen J Dias
(74) *Attorney, Agent, or Firm* — Nixon & Vanderhye

(57) ABSTRACT

In a pushbelt for a continuously variable transmission that includes at least one endless carrier and a number of transverse segments, which are mounted on the endless carrier. The transverse segments include a bearing surface that contacts the radial inside of the endless carrier, as well as a convexly curved tilting edge that is a part of a main body surface of the transverse segment. According to the present disclosure the convex curvature of the tilting edge extends both radially inward or below and radially outward or above the bearing surface, at least as seen in radial or height direction relative to the endless carrier.

19 Claims, 2 Drawing Sheets

(51) Int. Cl.
   *F16H 9/24*   (2006.01)
   *F16G 5/18*   (2006.01)
   *F16H 9/12*   (2006.01)

(58) Field of Classification Search
   USPC .......................................... 474/242, 201, 202
   See application file for complete search history.

(56) References Cited

U.S. PATENT DOCUMENTS

| | | | | |
|---|---|---|---|---|
| 4,365,965 A * | 12/1982 | Russ, Sr. | ................. | F16G 5/166 474/244 |
| 4,525,160 A * | 6/1985 | Okawa | ..................... | F16G 5/16 474/201 |
| 5,004,450 A * | 4/1991 | Ide | ............................ | F16G 5/16 474/242 |
| 5,123,880 A * | 6/1992 | Sekine | ..................... | F16H 9/24 474/244 |
| 6,074,317 A * | 6/2000 | Kobayashi | ................ | F16G 5/16 474/201 |
| 2002/0128103 A1 | 9/2002 | Brandsma | | |
| 2002/0137585 A1* | 9/2002 | Smeets | ..................... | F16G 5/16 474/242 |
| 2004/0053723 A1* | 3/2004 | Smeets | ..................... | F16G 5/16 474/242 |
| 2004/0082417 A1* | 4/2004 | Smeets | ..................... | F16G 5/16 474/242 |
| 2007/0072721 A1* | 3/2007 | Takagi | ..................... | F16G 5/16 474/242 |
| 2008/0305906 A1* | 12/2008 | Kobayashi | ................ | F16G 5/16 474/242 |
| 2009/0258743 A1* | 10/2009 | Kobayashi | ................ | F16G 5/16 474/248 |
| 2010/0144475 A1* | 6/2010 | Brandsma | ............... | F16G 5/166 474/264 |
| 2011/0300980 A1* | 12/2011 | Kuwabara | ................ | F16G 5/16 474/242 |
| 2012/0190490 A1* | 7/2012 | Morino | ..................... | F16G 5/16 474/240 |
| 2013/0281240 A1* | 10/2013 | Van Der Meer | .......... | F16G 5/16 474/244 |
| 2014/0371015 A1* | 12/2014 | Van Der Sluis | .......... | F16G 5/16 474/240 |
| 2015/0285336 A1* | 10/2015 | Ando | ........................ | F16G 5/16 474/8 |
| 2016/0053852 A1* | 2/2016 | Yagasaki | ................... | F16G 5/16 474/272 |
| 2016/0102732 A1* | 4/2016 | Yagasaki | ................... | F16G 5/16 474/242 |
| 2019/0032750 A1* | 1/2019 | Brandsma | ................ | F16G 5/16 |
| 2019/0101183 A1* | 4/2019 | Ninomiya | ................ | F16G 5/16 |
| 2019/0101186 A1* | 4/2019 | Ninomiya | ................ | F16G 5/16 |

FOREIGN PATENT DOCUMENTS

| | | |
|---|---|---|
| JP | S62-140246 U | 9/1987 |
| JP | S64-15554 A | 1/1989 |
| JP | H02-118229 A | 5/1990 |
| JP | H03-7553 U | 1/1991 |
| JP | 2000-065153 A | 3/2000 |
| JP | 2002-213539 A | 7/2002 |

* cited by examiner

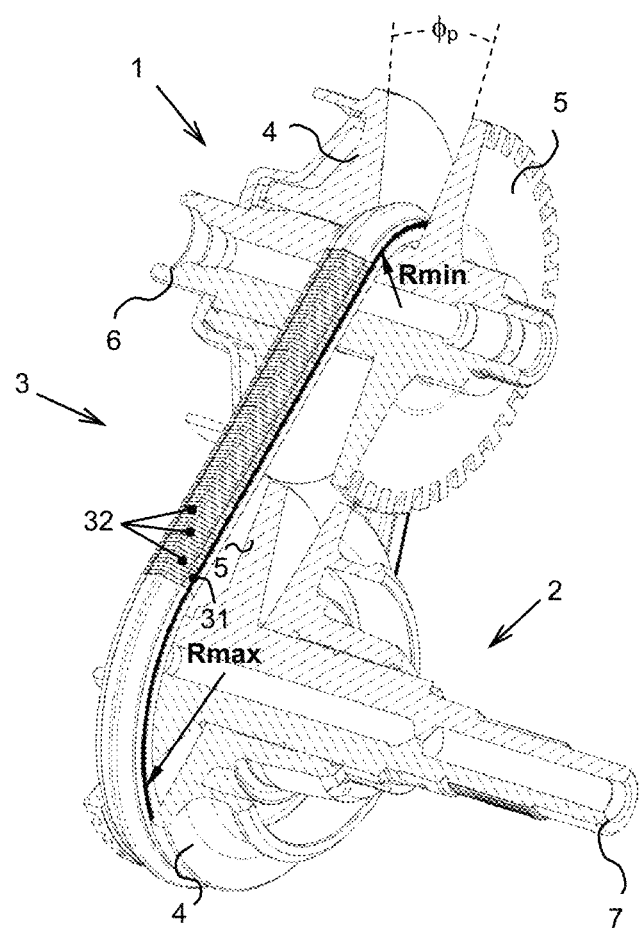
FIG. 1
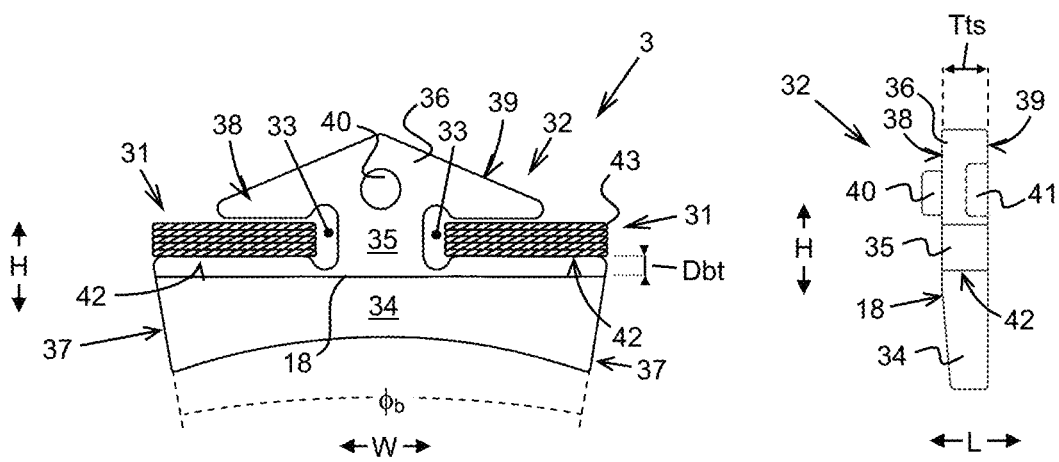
FIG. 2  FIG. 3

PUSHBELT FOR A CONTINUOUSLY VARIABLE TRANSMISSION AND A TRANSMISSION PROVIDED THEREWITH

BACKGROUND OF INVENTION

Field of Invention

This disclosure relates to a pushbelt-type drive belt for a belt-and-pulley-type continuously variable transmission, such as is applied in motor vehicles, in particular passenger cars.

Description of the Related Art

Such a pushbelt for a continuously variable transmission is commonly known and comprises at least one endless, i.e. ring-shaped carrier composed of a number of concentrically mounted flexible rings, and a number of transverse segments that are mounted on and that together essentially fill the entire circumference of the endless carrier. The transverse segments of the pushbelt can move along the circumference of the endless carrier, while exerting a pushing force between each other and thus carrying a driving force from one transmission pulley to another during operation.

In the following description of the transverse segment, the mentioned directions refer to the situation in which the transverse segment is part of the pushbelt. A longitudinal or thickness direction of the transverse segment corresponds to a circumferential direction of the pushbelt. A vertical or height direction of the transverse segment corresponds to a radial direction of the pushbelt. A horizontal or width direction of the transverse segment corresponds to a direction perpendicular to both the longitudinal direction and the vertical direction.

The transverse segment is provided with at least one opening for receiving a part of the at least one endless carrier of the pushbelt. The transverse segment comprises a bearing surface that represents the radial inside or lower boundary of the opening and that is available for contact with the radial inside of the endless carrier. For the purpose of contacting the conical discs of the transmission pulleys of the continuously variable transmission, the transverse segment is on both sides, as seen in the horizontal direction, provided with pulley disc contacting surfaces that mutually diverge at an angle that corresponds to the angle that is defined by and between the conical pulley discs.

As seen in the vertical direction, the thickness of the transverse segment reduces to allow the adjacent transverse elements to mutually rotate about the horizontal direction, whereby the pushbelt as a whole follows a curved trajectory such as is required between the conical pulley discs. Typically, an upper portion of the transverse segment is provided with an essentially constant thickness, whereas a thickness of a lower portion thereof decreases in downward direction. In between these two portions of the transverse segment, at least one of the main faces of the transverse segment, which main faces are oriented in the mutually opposite circumference directions of the pushbelt, includes a width-wise extending transition where the two parts of the respective main face, which parts are respectively associated with said upper portion and said lower portion of the transverse segment, meet. This transition is often referred in the art as either a rocking or tilting edge. This particular design of the transverse segment is, for example, known from the Japanese patent publication JP 2000-065153 (A). It is noted that a ratio between respective radial positions of the tilting edge at the two transmission pulleys determines, in part, the (rotational) speed ratio between the pulleys and (thus) of the transmission. In practice, a difference occurs between such ratio between the respective radial positions of the tilting edge, i.e. the geometrically determined transmission ratio, and the speed ratio due to a slipping of the pushbelt relative to the pulleys.

During operation of the pushbelt, also the endless carrier will slip, i.e. can move relative to the transverse segments, which movement is accompanied by an unwanted loss of power by friction (heat). It is well-known that such power loss can be minimised by minimising a vertical separation between the bearing surface and the tilting edge, because a longitudinal or slip speed of the endless carrier relative to the transverse segments is known to be proportional to such separation. According to JP-A-2000-065153 such vertical separation and the loss of power associated therewith are minimised by locating the sharp angled corner of the tilting edge in line with the carrier contacting surface of the transverse segment thus reducing such separation to zero, at least in theory.

In practice, however, the tilting edge cannot be implemented as a sharp corner, not only because of limitations of the preferred manufacturing process, but also in order to limit a contact stress between the adjacent transverse segments to an acceptable level so as not to exceed the mechanical strength and/or wear resistance of the material. Instead, the tilting edge is constituted by a convexly curved part of the respective main face, which curvature extends in the vertical direction of the transverse segment. Thus, in practice, a predominantly axially oriented line of contact between two adjacent transverse segments in the pushbelt displaces downwards in the said vertical direction in dependence on an angle of rotation there between, i.e. in dependence on the local curvature of the pushbelt. As a result, the said vertical separation between the bearing surface and the tilting edge necessarily varies with the radius of the curved trajectory of the pushbelt and can (thus) be minimal for one such radius only.

BRIEF SUMMARY OF THE INVENTION

It is an object of the present disclosure account for the convex curvature of the tilting edge in reducing friction losses associated with the slip between the transverse segments and the endless carrier thereof. More in particular, the present disclosure aims to optimise the design of the transverse segments in this respect.

According to the present disclosure, a further functional aspect of the pushbelt is brought into consideration, which functional aspect limits the extent of the tilting edge that is located above the bearing surface. Namely, within the endless carrier, the flexible rings thereof are each located at a slightly different radial position at the transmission pulleys, more in particular such radial position increases by the thickness of an individual ring between each consecutive, more radial outward located ring of the endless carrier. As a result, each flexible ring of the endless carrier operates at a slightly different individual geometric transmission ratio and circumference speed, whereby each ring exerts a friction force on a radially inner and/or a radially outer neighbouring ring or rings. In particular, a more radially outward located flexible ring is operated at a transmission ratio closer to unity or 1:1 relative to a more radially inward located flexible ring.

Furthermore, the transverse segments are operated at a specific geometric transmission ratio depending on the ratio between the respective radial positions of the line of contact on tilting edge of the transverse segments at the two transmission pulleys, which latter geometric ratio can necessarily not be equal to the individual geometric transmission ratio of the radially innermost ring of the endless carrier, at least not in every speed ratio of the transmission. Thus a difference typically exists between the geometric ratio of the transverse segments and of the radially innermost flexible ring of the endless carrier of the pushbelt.

Now in relation to the above-explained functional aspect a new design criterion could be defined for the optimal functioning of the pushbelt. Namely, according to the present disclosure, it is highly preferable that a difference in circumference speed between the transverse segments and the radially innermost flexible ring of the endless carrier has the same sign (i.e. has same direction of relative movement) as a difference in circumference speed between that radially innermost and the next consecutive ring of the endless carrier. Only in this case, the friction forces experienced by the radially innermost flexible ring on either radial side thereof are directed in mutually opposite (circumference) directions, just like those experienced by the other rings of the endless carrier. Hereby, an adverse mechanical loading of the innermost flexible ring that could otherwise lead to an early failure thereof, at least relative to the other rings of the endless carrier, is favourably avoided.

Effectively, the above design criterion entails that, within the pushbelt, the individual geometric ratio of the radially innermost flexible ring of the endless carrier is at all times closer to unity, i.e. ratio 1:1 than the said geometric ratio of the transverse segments. In mathematical terms the above design criterion thus entails that the absolute value of 1 minus the geometric transmission ratio of the radially innermost flexible ring is smaller than or equal to the absolute value of 1 minus the geometric transmission ratio of the transverse segments of the pushbelt.

It is noted that, when the tilting edge is located below, i.e. radially inward of the bearing surface and the endless carrier in its entirety, the above design criterion will always be satisfied automatically. In particular, no constraints apply to the curvature (e.g. circular or elliptical) and size (e.g. small or large radius of convex curvature) of the tilting edge. To the contrary, when the tilting edge is completely located above, i.e. radially outward of the bearing surface, the above criterion can never be satisfied, regardless of the curvature or size of the tilting edge. However, within the teaching of the present disclosure, it is still possible to favourable locate a part of the curvature of the tilting edge above the bearing surface in order to minimise power loss by friction, while satisfying the above design criterion.

In accordance with the present disclosure, the above design criterion requires that the bearing surface is located in between the axial contact line on the tilting zone that is associated with a maximum radius of curvature of the pushbelt's curved trajectory between the conical pulley discs and a minimum radius of curvature of such trajectory. In particular, the bearing surface is located in radial direction approximately halfway these contact lines.

BRIEF DESCRIPTION OF THE DRAWINGS

The above-described, novel transverse segment will now be explained further with reference to the drawing, in which equal reference signs indicate equal or similar parts and in which:

FIG. 1 provides a schematic perspective view of the continuously variable transmission with a drive belt running over two pulleys, which drive belt includes an endless carrier and a number of transverse segments and is known as a pushbelt;

FIG. 2 shows a cross-section of the known pushbelt oriented in the circumference direction thereof;

FIG. 3 provides a width-wise oriented view of a transverse segment of the known pushbelt;

DETAILED DESCRIPTION OF THE PREFERRED EMBODIMENTS

Figure 4:
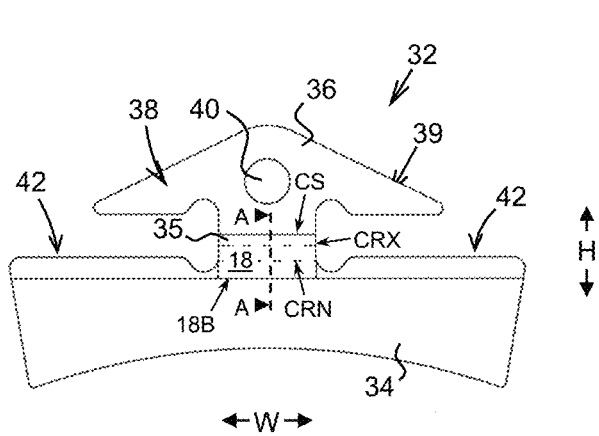
FIG. 4 provides a front elevation of a novel transverse segment embodying the teaching of the present disclosure.

In the figures, identical reference numbers relate to identical or at least comparable technical features.

The schematic illustration of a continuously variable transmission in FIG. 1 shows a pushbelt-type drive belt 3 that runs over two pulleys 1, 2 in a closed loop for transmitting torque between the pulley shafts 6, 7. The pushbelt 3 includes a flexible, ring-shaped, i.e. endless carrier 31 and a number of transverse segments 32 that are consecutively arranged along the circumference of the endless carrier 31 in an essentially contiguous row.

The transmission pulleys 1, 2 each include a pair of conical discs 4, 5 that define a tapered circumferential groove that opens towards the radial outside whilst enclosing an acute angle; the so-called pulley angle Φp. Circumference sections of the pushbelt 3 are located in the pulley grooves, while being clamped by and between the pulley discs 4, 5 of the respective pulley 1, 2. Thus, a force may be transmitted between the pulleys 1, 2 by the pushbelt 3 with the aid of friction there between.

The axial separation between these pulley discs 4, 5 can be controlled, typically by way of only one pulley disc 4 of the pulleys 1, 2 being arranged axially movable relative to a respective pulley shaft 6, 7, in order to control a speed ratio between the pulleys 1, 2. By changing the distance between the two conical discs 4, 5 of the pulleys 1, 2 in opposite direction, the radial positions or running radii R of the curved trajectory parts of the pushbelt 3 at the pulleys 1, 2 are changed in mutually opposite radial directions and, as a result, the ratio between rotational speeds of the two pulleys 1, 2 is varied. More in particular, the speed ratio is defined as a rotational speed of an output pulley 2 of the transmission, which output pulley 2 is associated with a load, divided by a rotational speed of an input pulley 1 of the transmission, which input pulley is associated 1 with an engine or motor driving the load.

In FIG. 1, the known transmission is depicted in its smallest speed ratio, wherein the pushbelt 3 is located at its smallest running radius Rmin at the input pulley 1 and at its largest running radius Rmax at the output pulley 2, such that the rotational speed of the input pulley 1 will be higher than that of the output pulley 2.

In FIG. 2, the pushbelt 3 is shown in a cross-section facing in the circumference or length direction L of the pushbelt 3, i.e. facing in a direction perpendicular to the axial or width direction W and the radial or height direction H of the pushbelt 3. In this exemplary embodiment of the pushbelt 3, two endless carriers 31 are included therein, which endless carriers 31 are shown in cross-section in this FIG. 2, whereas one transverse segment 32 of the pushbelt 3 is shown in a front elevation. The transverse segments 32 and the endless carriers 31 of the pushbelt 3 are typically made of steel.

In the exemplary embodiment that is illustrated in this FIG. 2, the endless carriers 31 are composed of five individual flexible rings 43 each, which rings 43 are mutually concentrically nested to form the endless carrier 31. In practice, the endless carriers 31 often comprise more than five flexible rings 43, e.g. six, nine or twelve or possibly even more.

The transverse segments 32 of the pushbelt 3 take-up the clamping force exerted between the discs 4, 5 of each pulley 1, 2 via contact faces 37 thereof, one such contact face 37 being provided at each axial side of the transverse segment 32. These contact faces 37 are mutually diverging in radial outward direction such that an acute angle is defined there between that is denoted the belt angle Φb of the pushbelt 3 and that closely corresponds to the pulley angle Φp.

The transverse segment 32, which is also shown in a side elevation in FIG. 3, is provided with two cut-outs 33 located opposite one another, which cut-outs 33 each open towards a respective axial side of the transverse segment 32 and each accommodate a small circumference section of a respective endless carrier 31. A first or base portion 34 of the transverse segment 32 thus extends radially inwards from the endless carriers 31, a second or middle portion 35 of the transverse segment 32 is situated in between the endless carriers 31 and a third or top portion 36 of the transverse segment 32 extends radially outwards from the endless carriers 31. The radially inner side of each cut-out 33 is delimited by a so-called bearing surface 42 of the base portion 34 of the transverse segment 32, which bearing surface 42 faces radially outwards, generally in the direction of the top portion 36 of the transverse segment 32, and contacts the inside of an endless carrier 31.

The transverse segments 32 are constrained by the endless carriers 31 in radial and axial directions, but are able to move, i.e. slide along the circumference thereof, so that a torque can be transmitted between the transmission pulleys 1, 2 by the transverse segments 32 pressing against one another and pushing each other forward along the endless carriers 31 in a direction of rotation of the pushbelt 3 and the pulleys 1, 2.

Furthermore, the transverse segment 32 is shown to be provided with a projection 40 that protrudes from a first main body surface 38 thereof and with a corresponding hole 41 that is provided in a second main body surface 39. In the pushbelt 3, the main body surfaces 38, 39 face in mutually opposite circumference directions L, whereby the projection 40 of a trailing transverse segment 32 is at least partially located in the hole 41 of a leading transverse segment 32, such that mutual displacement of these adjacent transverse segments 32 in a plane perpendicular to the circumferential direction of the pushbelt 3 is prevented or, at least, limited.

The second main body surface 39 of transverse segment 32 is essentially flat, whereas the first main body surface 38 of the transverse segment 32 is provided with a so-called tilting edge 18 that forms, in the radial direction H, the transition between an upper part of that first main body surface 38, extending essentially in parallel with the second main body surface 39, and a lower part thereof that is slanted such that it extends towards the second main body surface 39. The said upper part of the transverse segment 32 is thus provided with an essentially constant dimension between the main body surfaces 38, 39 thereof, i.e. as seen in the circumference direction L, which largest dimension represents the nominal thickness Tts of the transverse segment 32.

A transverse segment 32 thickness Tts of about 1.5 mm is most commonly applied in practice. However, a much broader range is of course available in this respect, for example any value between 1.2 and 2.2 mm can in principle be applied as the thickness Tts of the transverse segment 32.

The tilting edge 18 is provided to allow adjacent transverse segments 32 to mutually tilt or rotate while remaining in pushing contact with one another, such that the pushbelt 3 as whole can curve, i.e. can follow a curved trajectory, whereby the flat second main body surface 39 of a first transverse segment 32 rolls-off on the curvature of the tilting edge 18 on the first main body surface 38 of an adjacent, second transverse segment 32. In this latter respect it is noted that, although the tilting edge 18 is depicted in the FIGS. 2 and 3 only schematically by way of a single line, in reality the tilting edge 18 is provided in the shape of a convexly curved surface, such as a circular or elliptical arc. A radius of curvature Rte of the tilting edge 18 of 6 mm is most commonly applied in practice. However, a much broader range is of course available in this respect, for example any value between 3 and 15 mm can in principle be applied as the radius of curvature Rte of the tilting edge of 6.

An essentially horizontally, i.e. axially oriented line of contact between two adjacent, but mutually tilted transverse segments 32 on the tilting edge 18 of one of the transverse segments 32, thus increasingly displaces downwards in vertical or height direction, i.e. in radial inward direction, in dependency on an increasing mutual tilting angle between such two transverse segments 32. However, since the relative tilting angle between two adjacent transverse segments 32 remains limited, i.e. does not exceed 5 degrees or so, also the required radial extend of the tilting edge 18 remains limited. In particular, such required extend does not normally exceed 1 mm even in an extreme case of a transverse segment 32 having a thickness Tts of 2.2 mm and a radius of curvature Rte of the tilting edge of 12 mm. Rather, in the most commonly applied design of the transverse segment 32 (Tts=1.5 mm; Rte=6 mm), such radial extend of the tilting edge 18 is only about ⅓ mm, which cannot be accurately shown on the scale of FIGS. 2 and 3.

Furthermore, in FIGS. 2 and 3, the tilting edge 18 is located radially inward of the bearing surfaces 42. This mutual positioning of the tilting edge 18 and the bearing surfaces 42 is commonly applied in practice, but is also known to be suboptimal in terms of the power transmission efficiency of the pushbelt 3 during operation in the transmission. The present disclosure provides for an alternative, novel design of the transverse segments 32, in particular in terms of the positioning of the tilting edge 18 thereof relative to the bearing surfaces 42, which alternative design aims to improve the power transmission efficiency of the pushbelt 3 as a whole.

A first embodiment of such novel transverse segment 32 is schematically illustrated in the FIG. 4 in a front elevation thereof. For clarity and ease of explanation, the size, i.e. the radial extend of the tilting edge 18 has been exaggerated relative to—for instance—the height of the transverse segment 32 as a whole. Most relevantly in FIG. 4 and in accordance with the present disclosure, the tilting edge 18 extends in radially inwards direction from the line marked CS located radially outward of the bearing surfaces 42 and the line marked 18B located radially inward thereof. Thus, in accordance with the present disclosure, the tilting edge 18 extends both above and below the bearing surface and—in contrast with the known art depicted in FIG. 2—the tilting edge 18 is located not only in the base portion 34 of the transverse segment 32, but partly also in the middle portion 35 thereof. As a result, a line of contact on the tilting edge 18 between adjacent transverse segment 32 in the pushbelt 3 is, at least on average and at least in the radial direction, located closer to the bearing surfaces 42, such that a relative speed or slip there between is favourably reduced during operation.

Figure 5:
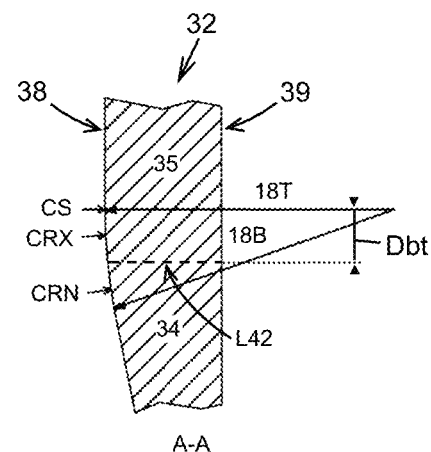
FIGS. 5, 6A, 6B and 6C provide a cross-section of the novel transverse segment of FIG. 4 in a number of orientations thereof.
Figure 6A:
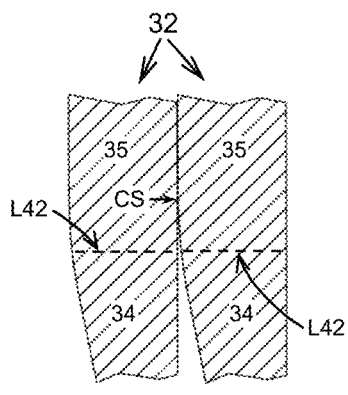
Figure 6B:
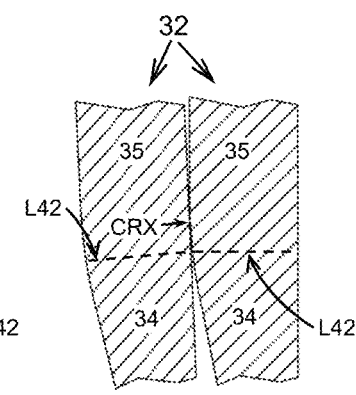
Figure 6C:
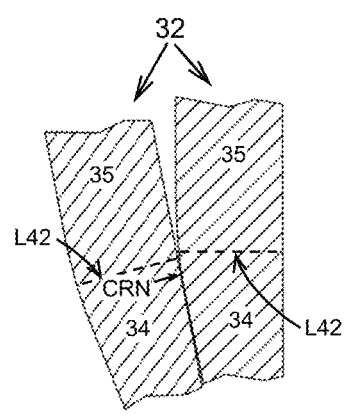

The above novel arrangement of the tilting edge 18 relative to the bearing surfaces 42 is illustrated in FIGS. 5, 6A, 6B and 6C as well, in a cross-section A-A of (a part of) the transverse segment 32. In FIG. 5 the arrow 18T indicates the topside, i.e. radial outer extend of the tilting edge 18 and the arrow 18B indicates the bottom side, i.e. radial inner extend of the tilting edge 18. Furthermore, the smaller arrows CS, CRX, CRN in FIGS. 5 and 6A-C indicate the (radial locations of the) of three possible lines of contact between two adjacent transverse segments 32, whereof:

arrow CS indicates such line of contact in a straight part of the pushbelt 3, where the adjacent transverse segments 32 are arranged essentially in parallel (see also FIG. 6A);

arrow CRX indicates such line of contact in a part of the pushbelt 3 that is curved at the said maximum radius of the curved trajectory thereof (see also FIG. 6B);

arrow CRN indicates such line of contact in a part of the pushbelt 3 that is curved at the said minimum radius of the curved trajectory thereof (see also FIG. 6C).

Finally in FIGS. 5 and 6A-C, the dashed line L42 indicates the radial location of the bearing surface 42.

In accordance with the present disclosure and as illustrated in FIGS. 4, 5 and 6A-C, the tilting edge 18 is designed and/or positioned such that, as seen in the radial direction, the bearing surface 42 is located approximately halfway between the axial contact line CS on the tilting edge 18 that is associated with the straight part of the pushbelt 3 between the conical pulley discs 4, 5 and the axial contact line CRN on the tilting edge 18a that is associated with the smallest, i.e. minimum radius of curvature Rmin of such curved trajectory. More specifically, as seen in the radial direction, the bearing surface 42 is located between the axial contact line CRX on the tilting edge 18 that is associated with the largest, i.e. maximum radius of curvature Rmax of such curved trajectory and the said axial contact line CRN associated with the minimum radius of curvature Rmin of such curved trajectory. More in particular, in the theoretically optimum location thereof within the context of the present disclosure, the bearing surface 42 is located somewhat closer to the said axial contact line CRX associated with the maximum radius of curvature Rmax than to the said axial contact line CRN associated with the minimum radius of curvature Rmin of such curved trajectory.

By the above novel design of the transverse segments 32 of the pushbelt 3, only a minimal relative movement occurs between the bearing surface 42 of the transverse segments 32 and a radial inside surface of the innermost flexible ring 43 of the endless carrier 31 during operation, while simultaneously also the condition is satisfied that the direction of such relative movement is the same as a direction of relative movement between the radially innermost ring 43 and the next neighbouring ring 43 of the endless carrier 31 to the radial outside of such radially innermost ring 43. Hereby, the pushbelt 3 that incorporates these novel transverse segments 32 will provide advantageously high power transmission efficiencies during operation, favourably without detriment to the longevity thereof.

Figure 7:
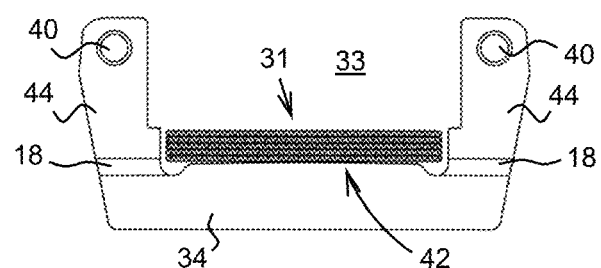
FIG. 7 provides a cross-section of a pushbelt incorporating the novel transverse segment in a second exemplary embodiment thereof.

A second embodiment of the transverse segment 32 in accordance with the present disclosure is schematically illustrated in the FIG. 7 in a cross-section of the pushbelt 3.

In the example of FIG. 7 the transverse segment 32 is provided with only a single, centrally located cut-out 33 located between two pillars 44 that extend from either axial side of the base portion 34 thereof. In this second embodiment, the tilting edge 18 is provided in two parts, each such part being partly positioned in a respective pillar part 44. Also in this second embodiment of the transverse segment 32, the tilting edge 18 is designed and/or positioned such that, as seen in the radial direction, the bearing surface 42 is located approximately halfway the radial extend thereof. This second embodiment has the advantage that the pushing force exerted between the adjacent transverse segments 32 at the line of contact there between on the tilting edge 18 is closer to the friction force exerted between the transverse segments 32 and the pulley discs 4, 5, whereby a (bending) loading of the transverse segment 32 is favourably low, at least compared to the above first embodiment of the novel transverse segment 32. Furthermore, in this second embodiment of the transverse segment 32, a relatively large radius of convex curvature Rte of the tilting edge of more than 9 mm, preferably of 12 mm, is applied.

The present disclosure, in addition to the entirety of the preceding description and all details of the accompanying figures, also concerns and includes all the features of the appended set of claims. Bracketed references in the claims do not limit the scope thereof, but are merely provided as non-binding examples of the respective features. The claimed features can be applied separately in a given product or a given process, as the case may be, but it may also be possible to apply any combination of two or more of such features therein.

The invention(s) represented by the present disclosure is (are) not limited to the embodiments and/or the examples that are explicitly mentioned herein, but also encompasses amendments, modifications and practical applications thereof, in particular those that lie within reach of the person skilled in the relevant art.

The invention claimed is:

1. A transverse segment for a drive belt with an endless carrier and a plurality of such transverse segments, slidably arranged on the endless carrier, the transverse segment comprising:

two main body surfaces extending in a thickness direction of the transverse segment, a first main body surface of the two main body surfaces being provided with a convexly curved tilting edge providing a transition in a height direction of the transverse segment between an upper part of the transverse segment with an essentially constant thickness and a lower part of the transverse segment with the thickness reducing in a direction away from the convexly curved tilting edge, a second main body surface of the two main body surfaces being provided with a flat section, the convexly curved tilting edge being configured to enable the transverse segment and another adjacent transverse segment with same features as the features of the transverse segment of the plurality of transverse segments in the drive belt to mutually tilt or rotate while remaining in pushing contact with one another in the drive belt by a flat section of a second main body surface of two other main body surfaces of the other adjacent transverse segment rolling-off on the convex curvature of the convexly curved tilting edge of the first main body surface of the transverse segment; and at least one cut-out that extends in-between the two main body surfaces and that is bounded by a bearing surface supporting an inside of the endless carrier in a radially-inward direction, wherein a radially-outer extend of the convexly curved tilting edge is located radially outward of the bearing surface, and wherein a radially-inner extend of the convexly curved tilting edge is located radially inward of the bearing surface.

2. The transverse segment according to claim 1, wherein the convexly curved tilting edge extends in essentially equal amounts radially outward and radially inward of the bearing surface.

3. The transverse segment according to claim 2, wherein the thickness thereof is between 1.2 and 2.2 mm, and wherein the convex curvature of the convexly curved tilting edge is at least approximated by a circular arc with a radius of between 3 and 15 mm.

4. The transverse segment according to claim 3, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by the circular arc with the radius of between 9 and 15 mm.

5. The transverse segment according to claim 3, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by the circular arc with the radius of approximately 12 mm.

6. The transverse segment according to claim 2, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by a circular arc with a radius of between 9 and 15 mm.

7. The transverse segment according to claim 2, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by a circular arc with a radius of approximately 12 mm.

8. The transverse segment according to claim 1, wherein the thickness thereof is between 1.2 and 2.2 mm, and wherein the convex curvature of the convexly curved tilting edge is at least approximated by a circular arc with a radius of between 3 and 15 mm.

9. The transverse segment according to claim 8, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by the circular arc with the radius of between 9 and 15 mm.

10. The transverse segment according to claim 8, wherein the at least one cut-out is one cut-out, and the transverse segment further comprises two pillar parts, a respective one of the two pillar parts of the transverse segment being provided on either side thereof in the width direction, with radially outer extends of the convexly curved tilting edge located in the pillar parts, wherein the convex curvature of the convexly curved tilting edge is at least approximated by the circular arc with the radius of approximately 12 mm.

11. The transverse segment according to claim 1, wherein the at least one cut-out is one cut-out, and the transverse segment further comprises two pillar parts, a respective one of the two pillar parts of the transverse segment being provided on either side thereof in a width direction, with radially outer extends of the tilting edge located in the pillar parts, wherein the convex curvature of the convexly curved tilting edge is at least approximated by a circular arc with a radius of between 9 and 15 mm.

12. The transverse segment of claim 11, wherein the circular arc has a radius of approximately 12 mm.

13. A drive belt for a continuously-variable transmission, the drive belt comprising:

an endless carrier; and a plurality of transverse segments, slidably arranged on the endless carrier, the transverse segments each being provided with two main body surfaces extending in a thickness direction of the respective transverse segment, a first main body surface of the two main body surfaces being provided with a convexly curved tilting edge providing a transition in a height direction of the respective transverse segment between an upper part of the respective transverse segment with an essentially constant thickness and a lower part of the respective transverse segment with the thickness reducing in a direction away from the convexly curved tilting edge, a second main body surface of the two main body surfaces being provided with a flat section, the convexly curved tilting edge being configured to enable a pair of adjacent transverse segments of the plurality of transverse segments in the drive belt to mutually tilt or rotate while remaining in pushing contact with one another in the drive belt by a flat section of a second main body surface of the two main body surfaces of one of the pair of adjacent transverse segments rolling-off on the convex curvature of the convexly curved tilting edge of the first main body surface of the other transverse segment of the pair of adjacent transverse segments, and at least one cut-out that extends in-between the two main body surfaces and that is bounded by a bearing surface supporting an inside of the endless carrier in a radially-inward direction, wherein a radially-outer extend of the convexly curved tilting edge is located radially outward of the bearing surface, and wherein a radially-inner extend of the convexly curved tilting edge is located radially inward of the bearing surface.

14. The drive belt according to claim 13, wherein the convexly curved tilting edge extends in essentially equal amounts radially outward and radially inward of the bearing surface.

15. The drive belt according to claim 14, wherein the transverse segments are mutually relatively tiltable while a line of contact between a pair of adjacent transverse segments displaces in a radial direction on the convexly curved tilting edge between a radially outermost position when the pair of adjacent transverse segments are mutually oriented essentially in parallel, an intermediate position when the pair of adjacent transverse segments are mutually tilted, and a radially innermost position when the pair of adjacent transverse segments are mutually tilted farther than the intermediate position,
wherein the bearing surface is located radially inward of the intermediate position of the line of contact and radially outward of the said radially innermost position of the line of contact.

16. The drive belt according to claim 13, wherein the transverse segments are mutually relatively tiltable while a line of contact between the pair of adjacent transverse segments displaces in a radial direction on the convexly curved tilting edge between a radially outermost position when the pair of adjacent transverse segments are mutually oriented essentially in parallel, an intermediate position when the pair of adjacent transverse segments are mutually tilted, and a radially innermost position when the pair of adjacent transverse segments are mutually tilted farther than the intermediate position,
wherein the bearing surface is located radially inward of the intermediate position of the line of contact and radially outward of the said radially innermost position of the line of contact.

17. A transmission comprising:
two variable pulleys; and
the drive belt according to claim 7 that is wrapped around the pulleys,
wherein a running radius of the drive belt at the pulleys varies between a maximum value and a minimum value thereof,
wherein the intermediate position of the line of contact between the pair of adjacent transverse segments occurs when the running radius of the drive belt has the maximum value,
wherein the radially innermost position of the line of contact between the pair of adjacent transverse segments occurs when the running radius of the drive belt has the minimum value, and
wherein the bearing surface is located at essentially equal distances in radial direction from the intermediate position of the line of contact and from the radially innermost position thereof.

18. A transmission comprising:
two variable pulleys; and
the drive belt according to claim 16 that is wrapped around the pulleys,
wherein a running radius of the drive belt at the pulleys varies between a maximum value and a minimum value thereof,
wherein the intermediate position of the line of contact between the pair of adjacent transverse segments occurs when the running radius of the drive belt has the maximum value,
wherein the radially innermost position of the line of contact between the pair of adjacent transverse segments occurs when the running radius of the drive belt has the minimum value, and
wherein the bearing surface is located on the radial direction closer to the intermediate position of the line of contact than to the radially innermost position thereof.

19. A transmission comprising:
two variable pulleys; and
the drive belt according to claim 16 that is wrapped around the pulleys,
wherein a running radius of the drive belt at the pulleys varies between a maximum value and a minimum value thereof,
wherein the intermediate position of the line of contact between the pair of adjacent transverse segments occurs when the running radius of the drive belt has the maximum value,
wherein the radially innermost position of the line of contact between the pair of adjacent transverse segments occurs when the running radius of the drive belt has the minimum value, and
wherein, for all possible combinations of the running radius of the drive belt in the transmission, a proportion between the radial positions of a radially innermost ring of the endless carrier at the pulleys has a value closer to 1 than a value of a proportion between the radial positions of the lines of contact between the pairs of adjacent transverse segments at the pulleys.

* * * * *